(12) United States Patent
Luebke (10) Patent No.: US 11,920,813 B2
(45) Date of Patent: Mar. 5, 2024

(54) DROP-IN EXHAUST FAN HUMIDITY CONTROLLER

(71) Applicant: Futura Technologies, LLC, Pleasant Grove, UT (US)

(72) Inventor: Michael Luebke, Pleasant Grove, UT (US)

(73) Assignee: FUTURA TECHNOLOGIES, LLC, Pleasant Grove, UT (US)

( * ) Notice: Subject to any disclaimer, the term of this patent is extended or adjusted under 35 U.S.C. 154(b) by 0 days.

(21) Appl. No.: 17/644,334

(22) Filed: Dec. 14, 2021

(65) Prior Publication Data

US 2022/0186966 A1 Jun. 16, 2022

Related U.S. Application Data

(60) Provisional application No. 63/125,159, filed on Dec. 14, 2020.

(51) Int. Cl.
| | |
|---|---|
| *G05D 22/02* | (2006.01) |
| *F24F 7/007* | (2006.01) |
| *F24F 11/00* | (2018.01) |
| *F24F 11/63* | (2018.01) |
| *G05B 15/02* | (2006.01) |
| *F24F 110/10* | (2018.01) |
| *F24F 110/20* | (2018.01) |

(52) U.S. Cl.
CPC .............. *F24F 11/63* (2018.01); *F24F 7/007* (2013.01); *F24F 11/0001* (2013.01); *G05B 15/02* (2013.01); *G05D 22/02* (2013.01); *F24F 2110/10* (2018.01); *F24F 2110/20* (2018.01)

(58) Field of Classification Search
CPC ........ F24F 11/63; F24F 7/007; F24F 11/0001; F24F 2110/10; F24F 2110/20; F24F 7/013; F24F 11/0008; F24F 2013/205; G05B 15/02; G05D 22/02
See application file for complete search history.

(56) References Cited

U.S. PATENT DOCUMENTS

| | | | |
|---|---|---|---|
| 9,976,764 B2 | 5/2018 | Ostrovsky et al. | |
| 2004/0041036 A1* | 3/2004 | Acker, Jr. | ............ F24F 11/0001 236/44 R |
| 2008/0029611 A1 | 2/2008 | Schnell et al. | |
| 2013/0020397 A1* | 1/2013 | Branham | ................ F24F 11/76 236/44 A |
| 2017/0261199 A1* | 9/2017 | Horng | ................... F21S 9/022 |
| 2017/0284840 A1* | 10/2017 | Mino | .................... G01D 21/02 |

* cited by examiner

*Primary Examiner* — Michael W Choi
(74) *Attorney, Agent, or Firm* — VLP Law Group LLP (57) ABSTRACT

Various implementations for a drop-in humidity controlling device with one or more sensors configured to collect humidity data and temperature data and a drop-in housing that connects between a power supply and a venting component, the drop-in housing including a command application configured to receive the humidity data and temperature data and cause the venting component to receive power from the power supply responsive to the humidity data and the temperature data.

20 Claims, 8 Drawing Sheets

DROP-IN EXHAUST FAN HUMIDITY CONTROLLER

BACKGROUND

The present disclosure relates to a drop-in exhaust fan humidity controller.

Humidity build-up in bathrooms as are a result of baths, showers, or other humidity contributors is a problem. Previous solutions have sought to remove the humidity using humidity sensing switches to replace the wall switch for the fan, replacement fans that include Bluetooth speakers, or humidity sensors. All these solutions require an electrician for replacement and are prohibitively expensive, even disregarding installation costs.

SUMMARY

According to one innovative aspect of the subject matter in this disclosure, a drop-in exhaust fan humidity controller is described. In an example implementation, one general aspect includes a drop-in humidity controlling. The drop-in humidity controlling device also includes one or more sensors configured to collect humidity data and temperature data; and a drop-in housing that connects between a power supply and a venting component, the drop-in housing including a command application configured to receive the humidity data and temperature data and cause the venting component to receive power from the power supply responsive to the humidity data and the temperature data.

Implementations may include one or more of the following features. The drop-in humidity controller device where the command application is further configured to cause the venting component to receive power from the power supply responsive to the humidity data exceeding a threshold value. Command application is further configured to cause the venting component to receive power from the power supply responsive to the humidity data increasing over beyond a threshold value over a short period of time. The command application is further configured to analyze the humidity data and the temperature data sampled over a period of time, compare the analyzed humidity data and temperature data to a table of events to identify a matching event, and cause the venting component to receive power from the power supply responsive to the matching event being a shower event. The shower event corresponds to data showing an increase in temperature and an increase in humidity over a short period of time. The command application is further configured to analyze the humidity data and the temperature data sampled over a period of time, compare the analyzed humidity data and temperature data to a table of events to identify a matching event, and cause the venting component to stop receiving power from the power supply responsive to the matching event being an air conditioning event. The air conditioning event corresponds to data showing a decrease in temperature and an increase in humidity over a short period of time. The drop-in humidity controlling device may include: a cover that is configured to attach to the venting component, the cover including one or more peripheral components connectable to the command application and incorporated into an exterior surface of the cover. The peripheral components includes one or more of a music playback system, a speaker, a microphone, and a light. The cover further may include one or more sensors connectable to the command application and incorporated into an exterior surface of the cover. Implementations of the described techniques may include hardware, a method or process, or computer software on a computer-accessible medium.

One general aspect includes a drop-in power controller. The drop-in power controller also includes a power command application that receives a command to control a power supply to an exhaust fan; and a power controller device that causes the power supply to be connected to the exhaust fan in response to the power command application receiving the command to turn on the exhaust fan in response to a criteria being satisfied. Other embodiments of this aspect include corresponding computer systems, apparatus, and computer programs recorded on one or more computer storage devices, each configured to perform the actions of the methods.

Implementations may include one or more of the following features. The drop-in power controller where the power controller device is connected between the power supply and the exhaust fan. The power controller device is connected to additional peripheral hardware. The additional peripheral hardware includes one or more of a music playback system, a speaker, a microphone, and a light. The power controller device is connected to one or more sensors. The one or more sensors include one or more of a humidity sensor, a temperature sensor, a water sensor, a heat sensor, an ambient light sensor, a motion sensor, and a noise sensor. The criteria being satisfied includes the power controller device receives sensor data from the one or more sensors and determines the criteria is satisfied if the sensor data exceeds a threshold value. The sensor data exceeds a threshold value includes humidity data exceeding a humidity value. Implementations of the described techniques may include hardware, a method or process, or computer software on a computer-accessible medium.

The method also includes receiving at a drop-in humidity control device, humidity sensor data from a humidity sensor receiving at the drop-in humidity control device, temperature sensor data from a temperature sensor; comparing, using a processor the drop-in humidity control device, the humidity sensor data and the temperature sensor data to a table of events; determining, using a processor the drop-in humidity control device, a match between the humidity sensor data and the temperature sensor data with an event from the table of events; and responsive to determining the match with the event, causing the drop-in humidity control device to provide power to a venting component that the drop-in humidity control device is connected to. Other embodiments of this aspect include corresponding computer systems, apparatus, and computer programs recorded on one or more computer storage devices, each configured to perform the actions of the methods.

Implementations may include one or more of the following features. The method where the event is a shower event, and the shower event matches with the temperature sensor data increasing and the humidity sensor data increasing. Implementations of the described techniques may include hardware, a method or process, or computer software on a computer-accessible medium.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
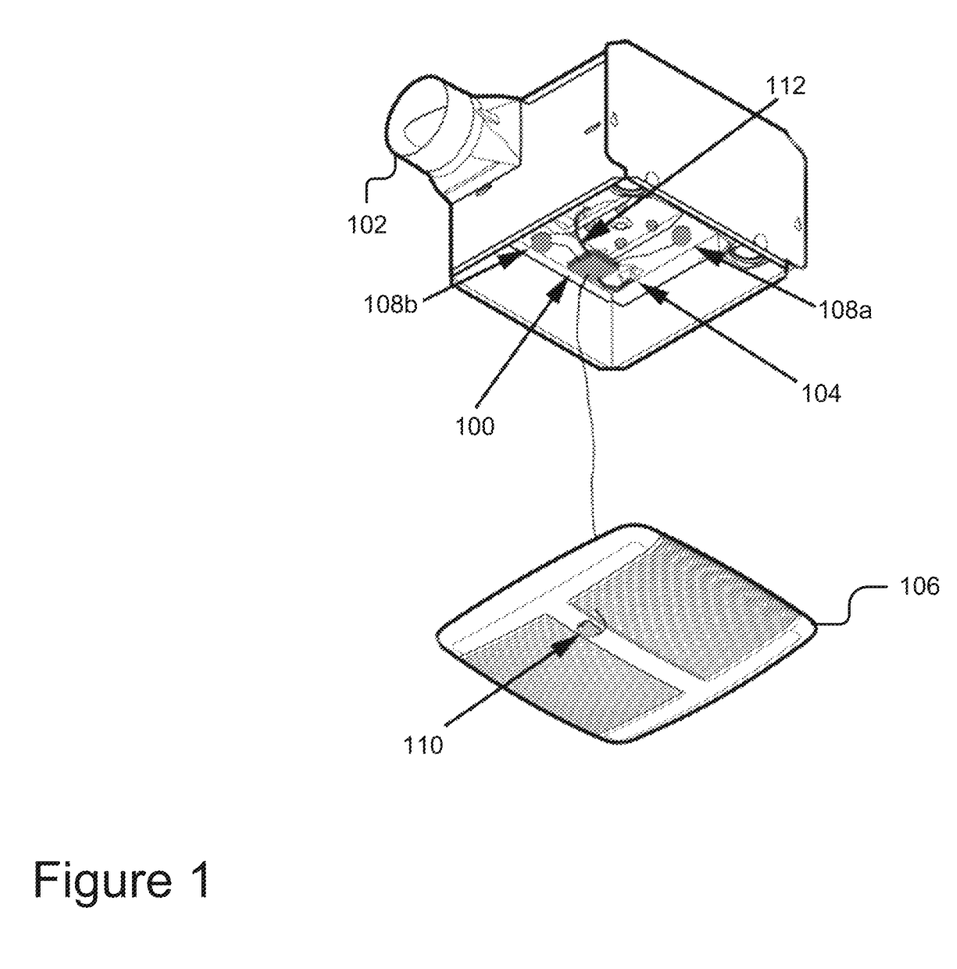
FIG. 1 is an example of a drop-in humidity controller system.

FIG. 1 is an example configuration showing a low-cost solution incorporating a device 100, such as a drop-in humidity controller device, that can be installed in a venting component 102, for example, a bathroom fan such that the device 100 plugs in between the power supply 104 and the power to venting component 112 and controls the venting component 102 based on various readings received from sensors connected to the device 100, such as humidity and temperature. In some implementations, the device 100 can also control other peripheral devices, such as a light 110, speaker 108, and or smart home connectivity such as amazon Alexa control or google home control as described elsewhere herein. As shown in FIG. 1, the configuration may also include a cover 106 that can be positioned onto the venting component 102 to cover the internals of the fan 102 and/or the device 100. In some implementations, the cover 106 may be connected to the device 100 and include one or more peripheral devices, such as a light 110 that may be controlled by the device 100.

The device 100 may be a drop-in humidity exhaust controller that is configured to interrupt the regular power from an AC voltage source in a conventional venting component 112, such as a bathroom fan and control the conventional component 112 based on various readings from the device 100. The device 100 may be configured for a simple installation that can be performed without hiring expensive professionals for the installations and can generally be installed in most common venting components 112 simple by connecting the AC voltage source (power supply 104) to the device 100 instead of the venting component 102 and then connecting the power to the venting component 112 to the device. When the device 100 determines that the venting component 112 (e.g., a motor of the venting component 102), then the device 100 provides power to the venting component 112. In some implementations, the device 100 may determine that the venting component 102 should be turned on in response to a sensor reading (such as a temperature or humidity reading from a sensor 210 that exceeds a specific threshold reading). In further implementations, the device 100 may include a humidity application 214 that can perform additional analytics, such as determining when an air conditioner is running rather than a shower and use those analytics in addition to the sensor 210 readings in order to operate the venting component 102.

In some implementations, the device 100 may be configured to mount within an interior area of the venting component 102 such that the device 100 is hidden from view (such as behind a cover 106 of the venting component 102). The device 100 may be configured to mount in such as a way as to not impede the operation of a motor or other device within the venting component 102.

Figure 2:
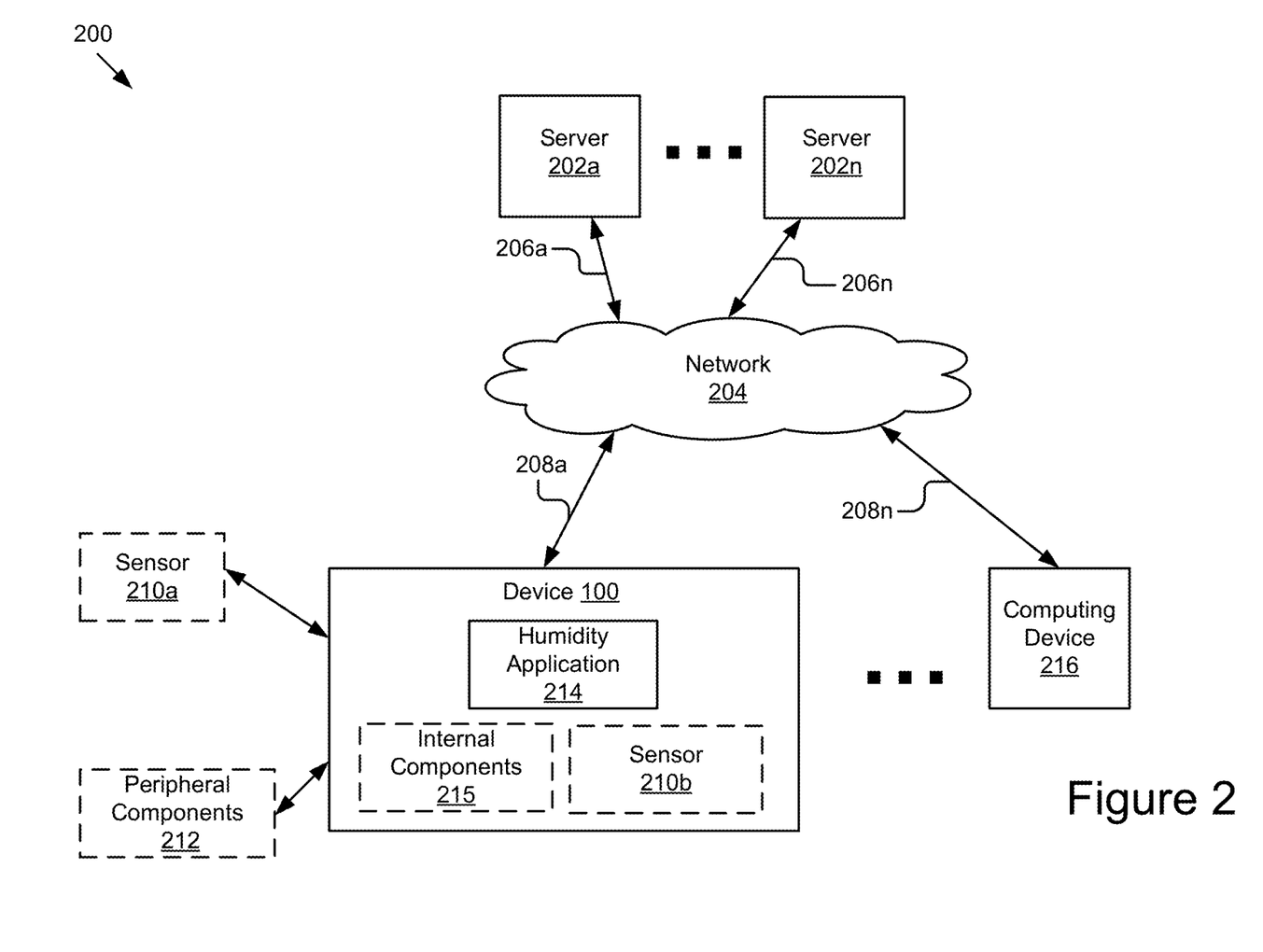
FIG. 2 is a block diagram illustrating an example computer system for detecting humidity and powering on a venting component.

FIG. 2 is a block diagram illustrating an example system 200 for controlling a venting component 102 or other devices with the device 100. The illustrated system 200 includes a device 100, computing device 216, and servers 202a . . . 202n (also referred to individually and collectively as 202), which are communicatively coupled via a network 204 for interaction with one another. For example, the device 100 and/or computing device 216 may be respectively coupled to the network 204 via signal lines 208a . . . 208n. The servers 202a . . . 202n may be coupled to the network 204 via signal lines 206a . . . 206n, respectively. The use of the nomenclature "a" and "n" in the reference numbers indicates that any number of those elements having that nomenclature may be included in the system 200.

The network 204 may include any number of networks and/or network types. For example, the network 204 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The computing device 216 may have processing and communication capabilities. For instance, a computing device 216 may include a processor (e.g., virtual, physical, etc.), a memory, a power source, a network interface, and/or other software and/or hardware components, such as front and/or rear facing cameras, display, graphics processor, wireless transceivers, keyboard, camera, speaker, sensors, firmware, operating systems, drivers, various physical connection interfaces (e.g., USB, HDMI, etc.). The computing device 216 may couple to and communicate with one another and the other entities of the system 200 via the network 204 using a wireless and/or wired connection. In some implementations, the computing device 216 may be a connected home device, such as an Amazon Alexa or Google Home smart device and the computing device 216 may be capable of receiving commands from the device 100 via the network 204.

The device 100 may have processing and/or communication capabilities, for instance, a device 100 may include a processor (e.g., virtual, physical, etc.), a memory, a power source, a network interface, and/or other software and/or hardware components, such as display, graphics processor, wireless transceivers, keyboard, camera, sensors, firmware, operating systems, drivers, various physical connection interfaces (e.g., USB, HDMI, etc.). The device 100 may couple to and communicate with one another and the other entities of the system 200 via the network 204 using a wireless and/or wired connection.

As depicted in FIG. 2, the device 100 may include a humidity application 214, and in some implementations a sensor 210b and/or internal components 215. The humidity application 214 can receive readings from various connected sensors 210 and determine based on those readings when to operate a venting component 102.

The servers 202 may each include one or more computing devices having data processing, storing, and communication capabilities. For example, the servers 202 may include one or more hardware servers, server arrays, storage devices and/or systems, etc., and/or may be centralized or distributed/cloud-based. In some implementations, the servers 202 may include one or more virtual servers, which operate in a host server environment and access the physical hardware of the host server including, for example, a processor, memory, storage, network interfaces, etc., via an abstraction layer (e.g., a virtual machine manager).

The servers 202 may include software applications operable by one or more computer processors of the servers 202 to provide various computing functionalities, services, and/or resources, and to send data to and receive data from the device 100 and/or computing device 216. For example, the software applications may provide functionality for connected smart home controls; internet searching; social networking; web-based email; blogging; micro-blogging; photo management; video, music and multimedia hosting, distribution, and sharing; business services; news and media distribution; user account management; or any combination of the foregoing services. It should be understood that the servers 202 are not limited to providing the above-noted services and may include other network-accessible services.

The system 200 in FIG. 2 may also include one or more external sensors 210a, such as external temperature or humidity sensors that can be connected (either wirelessly via the network 204 or via a wired connection to the device 100). The external sensors 210a can detect various sensor readings from a location separate from the device, such as to improve humidity control sensing (e.g., by not having a sensor hidden behind a vent cover 106 and instead having the sensor 210a closer to a shower head, etc.). In further implementations, the external sensors 210a may be temperature sensors that can be placed at various locations throughout a building to change the venting components 102 operation based on the various readings.

The system 200 in FIG. 2 may also include other peripheral components, such as lights, speakers, etc. that can be wirelessly or wired connected to the device 100 and send/receive commands from the device 100 as described elsewhere herein.

It should be understood that the system 200 illustrated in FIG. 2 is provided by way of example, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200 may be integrated into a single computing device or system or additional computing devices or systems, etc.

Figure 3:
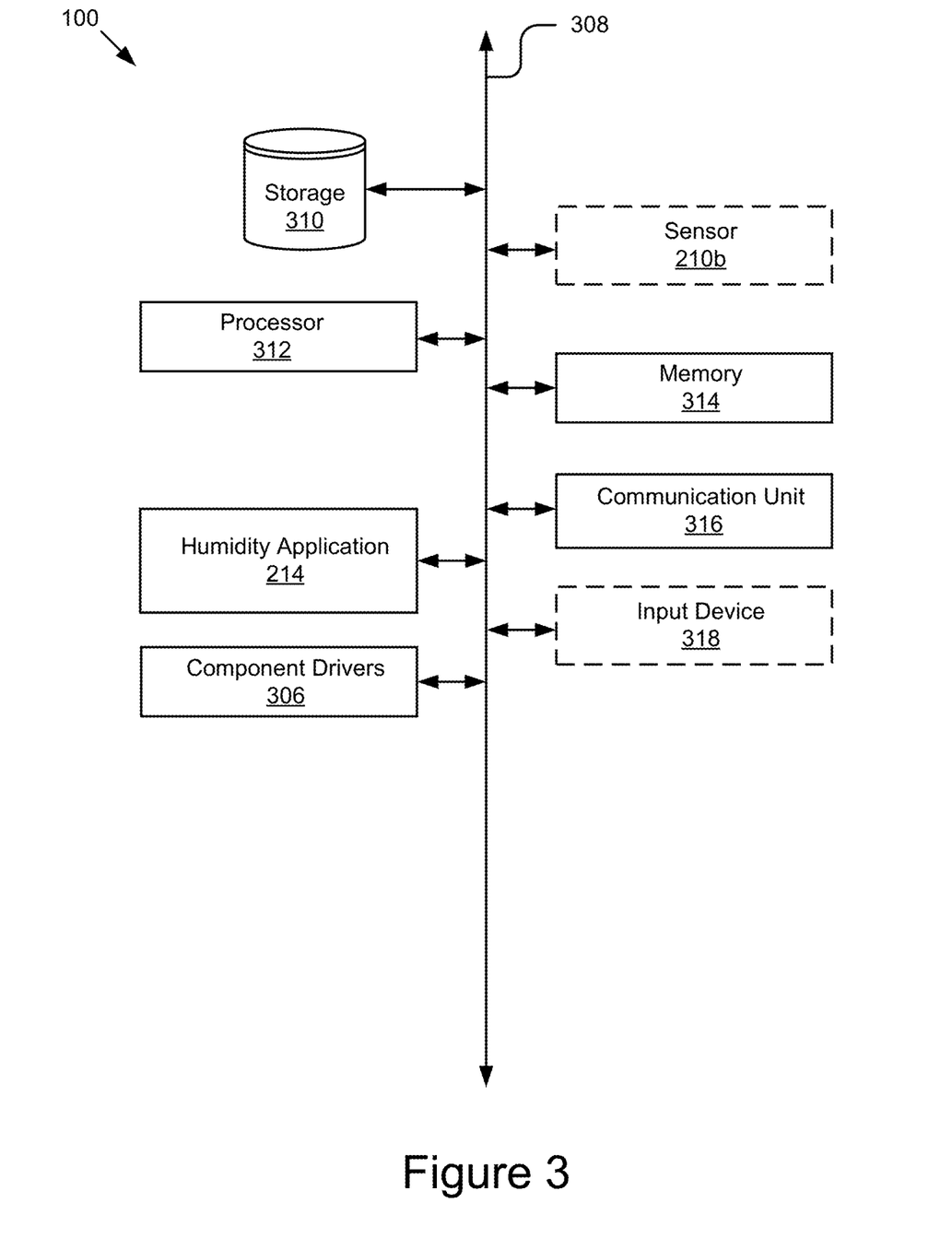
FIG. 3 is a block diagram illustrating an example device.

FIG. 3 is a block diagram of an example device 100. As depicted, the device 100 may include a processor 312, memory 314, communication unit 316, component drivers 306, and an input device 318, which are communicatively coupled by a communications bus 308.

The processor 312 may execute software instructions by performing various input/output, logical, and/or mathematical operations. The processor 312 has various computing architectures to process data signals including, for example, a complex instruction set computer (CISC) architecture, a reduced instruction set computer (RISC) architecture, and/or an architecture implementing a combination of instruction sets. The processor 312 may be physical and/or virtual and may include a single core or plurality of processing units and/or cores.

The memory 314 is a non-transitory computer-readable medium that is configured to store and provide access to data to the other elements of the device 100. In some implementations, the memory 314 may store instructions and/or data that may be executed by the processor 312. For example, the memory 314 may store the humidity application 214 and the component drivers 306. The memory 314 is also capable of storing other instructions and data, including, for example, an operating system, hardware drivers, other software applications, data, etc. The memory 314 may be coupled to the bus 308 for communication with the processor 312 and the other elements of the device 100.

The communication unit 316 may include one or more interface devices (I/F) for wired and/or wireless connectivity with the network 204 and/or other devices. In some implementations, the communication unit 316 may include transceivers for sending and receiving wireless signals. For instance, the communication unit 316 may include radio transceivers for communication with the network 206 and for communication with nearby devices using close-proximity (e.g., Bluetooth®, NFC, etc.) connectivity. In some implementations, the communication unit 316 may include ports for wired connectivity with other devices. For example, the communication unit 316 may include a CAT-5 interface, Thunderbolt™ interface, FireWire™ interface, USB interface, etc.

The input device 318 may include any device for inputting information into the device 100. In some implementations, the input device 318 may include one or more peripheral devices. For example, the input device 318 may include a keyboard (e.g., a QWERTY keyboard), a pointing device (e.g., a mouse or touchpad), microphone, a camera, etc. In some implementations, the input device 318 may include a touch-screen display capable of receiving input from the one or more fingers of the user. For instance, the functionality of the input device 318 and the display may be integrated, and a user of the computing device 216 may interact with the computing device 216 by contacting a surface of the display using one or more fingers. In this example, the user could interact with an emulated (i.e., virtual or soft) keyboard displayed on the touch-screen display by using fingers to contact the display in the keyboard regions. In further implementations, the input device 318 may be a separate computing device 216 that is connected to the device 100 via the network 204 and can send various input commands via the network 204.

The humidity application 214 include software and/or logic for identifying one or more triggering events to turn on or off the venting component 102, such as by receiving sensor 210 information and determining triggering events based on the sensor 210 information. The activity application(s) 214 may be coupled to the sensor 210 via the processor 312 and/or the bus 308 to receive the information. In some implementations, the humidity application 214 includes a power command application that receives commands to control a power supply for a venting component 102, such as an exhaust fan. The humidity application 214 can also be referred to herein as the power command application. In some implementations, the humidity application 214 includes a power controller device that causes the power supply to be connected to the venting component 102 in response to the power command application determining various matches of events.

The component drivers 306 includes software storable in the memory 314 and operable by the processor 312 to control/operate various internal components 215 and/or peripheral components 212. For example, the component drivers 306 may be software driver executable by the processor 312 for signaling the peripheral component 212 representing a light to turn on or off. The component drivers 306 are capable of controlling various features of the internal components 215 and/or external components 212.

The storage 310 is an information source for storing and providing access to stored data, such as a database of historical readings, routines, and/or triggering events, user profile information, community developed virtual routines, virtual enhancements, etc., object data, calibration data, and/or any other information generated, stored, and/or retrieved by the activity application(s) 214.

In some implementations, the storage 310 may be included in the memory 314 or another storage device coupled to the bus 308. In some implementations, the storage 310 may be or included in a distributed data store, such as a cloud-based computing and/or data storage system. In some implementations, the storage 310 may include a database management system (DBMS). For example, the DBMS could be a structured query language (SQL) DBMS. For instance, storage 310 may store data in an object-based data store or multi-dimensional tables comprised of rows and columns, and may manipulate, i.e., insert, query, update, and/or delete, data entries stored in the verification data store using programmatic operations (e.g., SQL queries and statements or a similar database manipulation library). Additional characteristics, structure, acts, and functionality of the storage 310 is discussed elsewhere herein.

Figure 4:
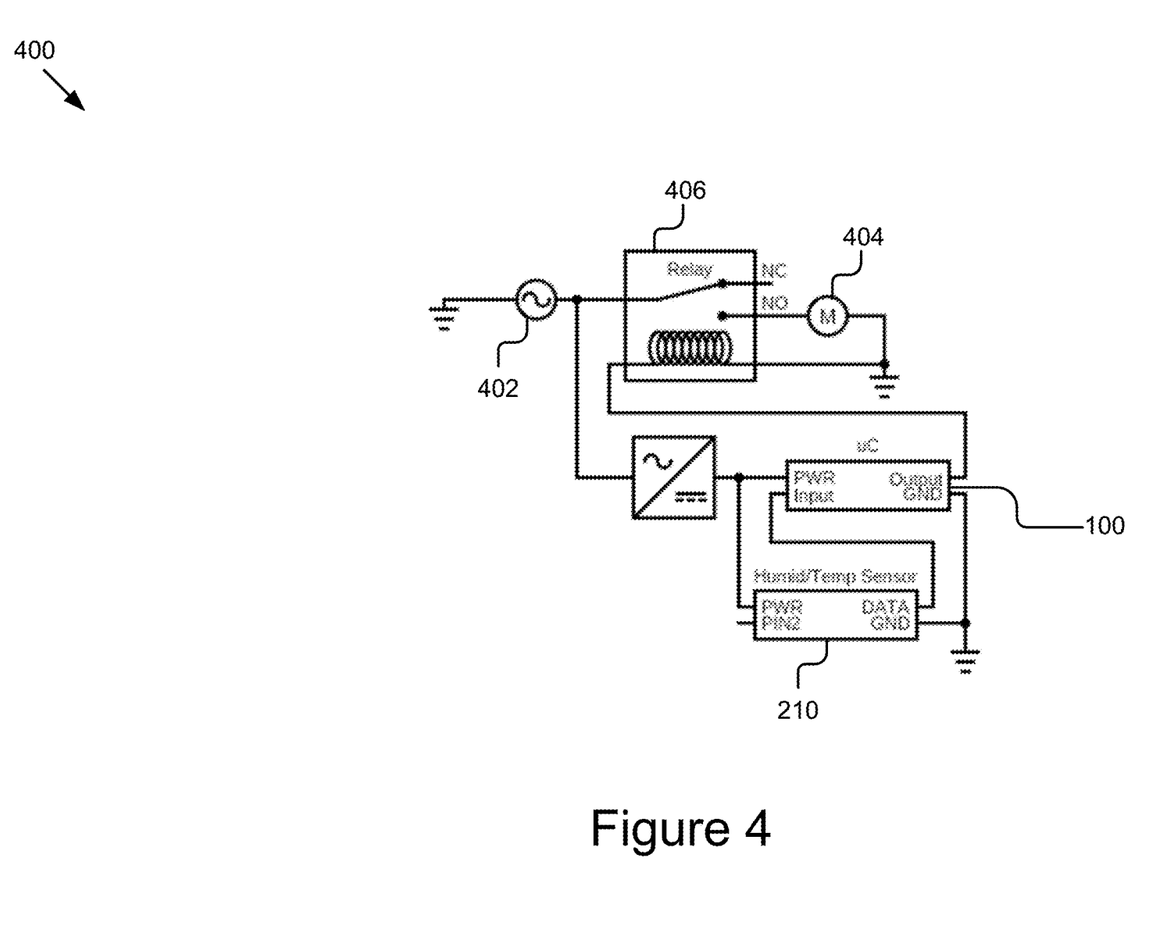
FIG. 4 is an example circuit for controlling a venting component.

FIG. 4 depicts an example circuit 400 that could be used with the device 100 to control the operation of a venting component 102 (not shown). As shown in the example circuit 400, the AC voltage source 402 is connected to the motor 404 of the venting component 102 via a relay 406. The device 100 and the sensor 210 control when that relay 406 provides power to the motor 404 from the AC voltage source 402. In some implementations, this device 100 can be installed in preexisting venting components 102, such as a regular bathroom fan that is already installed in a person's house. The installation merely requires installing the device 100 between the original power supply 104 and the power to the venting component 112. This allows for the device 100 to be easily installed in existing venting components 102. In some implementations, the venting component 102 may be a device other than a bathroom fan, such as a high/low pressure safety fan, a vent hood, an oven range vent, etc. In some implementations, the venting component 102 operates by a device other than a motor 404, such as a low pressure-high pressure exchange, vacuum, etc. In those implementations, the power supply to the device operating the exchange or vacuum is used instead of the motor 404 as shown in FIG. 4.

Figure 5:
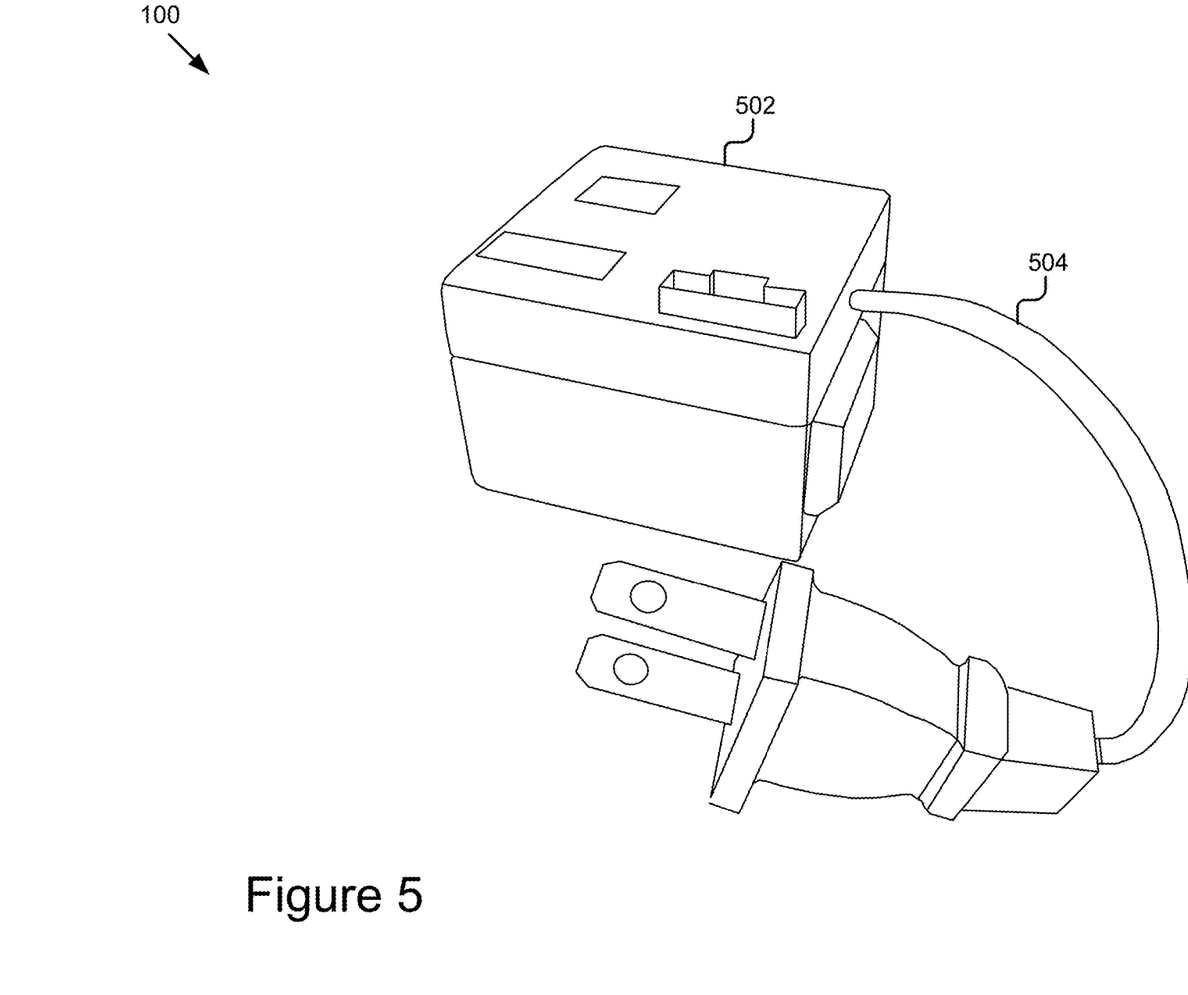
FIG. 5 is an example device for controlling a venting component.

FIG. 5 depicts an example configuration of a housing 502 for the device 100. As shown in FIG. 5, the housing 502 may encompass the electric components of the device 100 and allow for access to various connection points of the device 100 through various ports on the housing 502. In some implementations, the housing 502 may include a power supply connection 504 for plugging into the AC power source 402. In some implementations, the device 100 may be designed to operate with a wall switch, such as the specific wall switch that previously controlled the bathroom fan. In some implementations, the device 100 may be designed to operate with the wall switch for the venting component 102 left in the "on" position. However, in other implementations, the device 100 could also be incorporated with a specific wall switch that always provides power and can signal the device 100 when the switch is pressed to turn on for general ventilation using the venting component 102. In some implementations, the device 100 can also provide general ventilation by turning on for a given period of time each time the switch is turned on and then after reverting to humidity sensing for fan control of the venting component 102.

Figure 6:
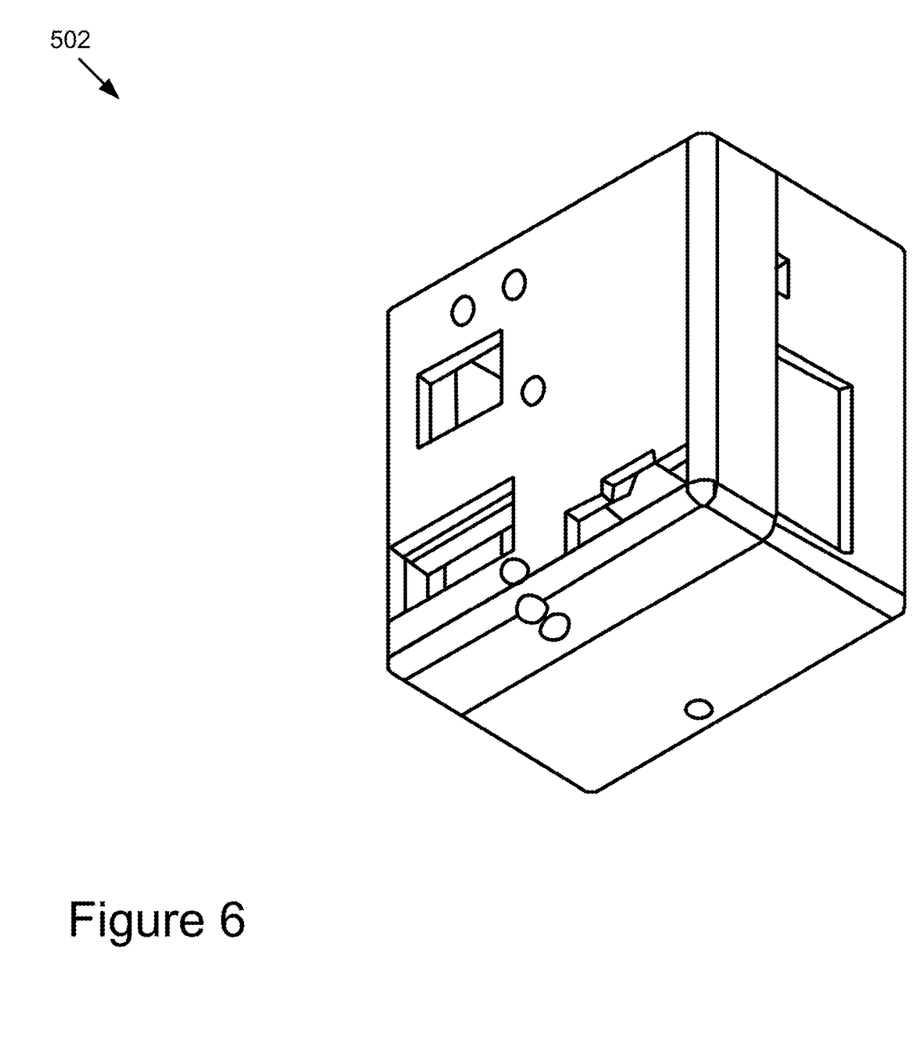
FIG. 6 is an example housing for a device for controlling a venting component.

FIG. 6 depicts another specific configuration for a housing 502 of the device 100. As shown in the example of the specific configuration in FIG. 5, various ports are accessible on different surfaces for connection to the power supply 104, power to venting component 112, peripheral components 212, and/or sensors 210. In some implementations, each of these ports or access points is sealed against moisture and the case is configured to be durable and protective of the components inside. In some implementations, internal sensors 210b may be configured to situate within one or more of these ports in order to provide more accurate readings than if the sensor had to collect a reading from inside the housing 502.

Figure 7:
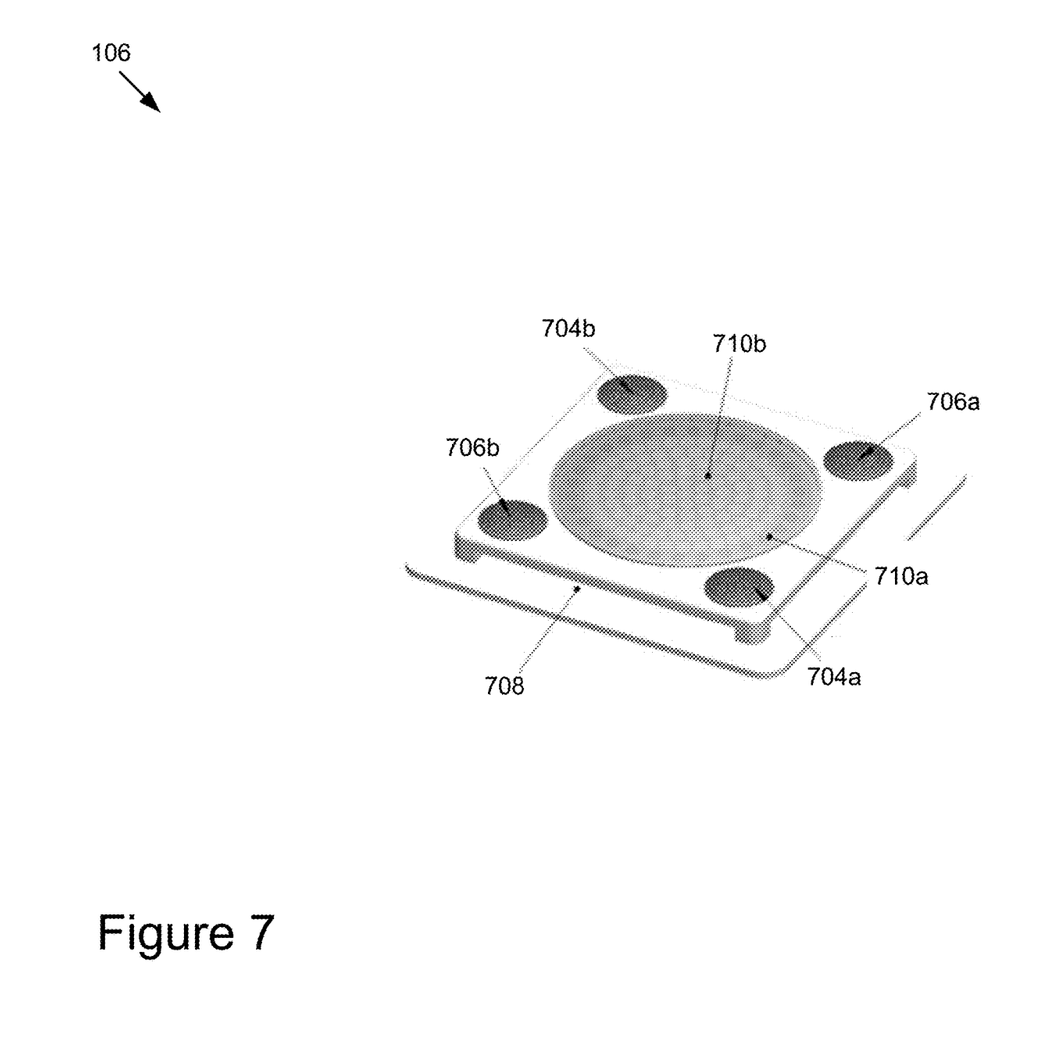
FIG. 7 is an example cover with peripheral components.

FIG. 7 depicts an example aftermarket cover 106 that may include one or more peripheral components that may incorporate various "smart" features into the venting component 102 using the device 100 (not shown). For example, in one implementation, a lighting source 710 can be incorporated into the cover 106. The lighting source 710 could have power provided by the device 100 from the AC power supply 104 and the device 100 can control when the lighting source 710 is turned on/off. For example, the lighting source 710 could be a night light that is configured to use a separate light sensor 210 (not shown), such as an ambient light sensor, to detect low light conditions and the device 100 causes the lighting source 710 to turn on when the low light condition is detected. In further implementations, the lighting source 710 could be turned on using a motion sensor 210 (not shown) and the device 100 causes the lighting source 710 to turn on in response to the motion being detected. In further implementations, the condition of both motion and low light being detected could trigger the device 100 to cause the lighting source 710 to turn on for a period of time. In some implementations, the lighting source 710 could be a LED light or external light mounted to the exterior surface of the exhaust cover 106 of the venting component 102.

In some implementations, the lighting source 710 could include both RGB LED indicator lights 710a and/or white illumination lights 710b and the device 100 could determine which lights to turn on based on various sensor and/or alert readings. For example, if the low light and motion is detected, the device 100 could turn on the white illumination lights 710b at a low light setting. In further example, if a separate device, such as a smart home connected device detects a security alert, the device 100 could receive that signal from the smart home connected device and cause a bright illumination to occur on the white illumination lights 710b. In further implementations, the device 100 could use the various RGB LED indicator lights 710a to display various patterns or alerts. For example, the device 100 could cause the RGB LED indicator lights 710a to display a small blue light on the RGB LED indicator lights 710a when the venting component 102 is operating. In further implementations, the device 100 could cause the RGB LED indicator light 710a to display a ring of lights that disappear as a timer counts down to automatic shutoff of the venting component 102.

In some implementations, the device 100 may include a music playback system consisting of one or more speakers such as speakers mounted within the device 100 or incorporated within the cover 106, such as speakers 704a and 704b. These speakers 704 may receive their audio signal from a separate computing device 216, such as a mobile phone or other device using various transmission technologies such as but not limited to Bluetooth, Apple AirPlay, etc. In some implementations, the device 100 may be designed to reduce the sound of the fan motor 404 or other venting apparatus while the music playback system is operating. In further implementations, the device 100 may sample the existing venting component 102 noise (such as by using a microphone 706) during operation and use noise cancellation algorithms with the sampled venting component 102 noise in order to employ noise reduction when the speakers 704 are being used with the music playback system. The noise cancellation algorithms can create noise patterns to diminish the sound of the fan. In further implementations, in a bathroom setting, the device 100 can detect the motion using a motion sensor and turn on the venting apparatus while the bathroom is being used. While the venting apparatus is on, the device 100 can cause music or white noise to play through the speakers 704 in order to both diminish the sound of the venting apparatus, while also creating a comfortable atmosphere in the bathroom. In some implementations, once the motion is no longer detected using the motion sensor, the device 100 can turn off the music/white noise and turn off the venting apparatus after a period of time.

In some implementations, the device 100 may also contain one or more microphones 706 to receive audio instructions allowing it to accept voice commands or other audio samples. These commands may be used to control the device 100 itself or other devices connected through a unifying ecosystem, such as a commonly referred to as a smart home. Various services such as Amazon Alexa or Google Home could be integrated with the device 100 to accomplish the smart home ecosystem.

In some implementations, the cover 106 may include one or more ventilation holes 708 that allow air to pass through the cover 106. In some implementations, the ventilation holes 708 can be designed specifically so the baffle space allows air to flow through with reduced noise. In further implementations, the ventilation holes 708 may be larger to reduce the number of times it needs to be cleaned from dust clogging the ventilation holes 708.

Figure 8:
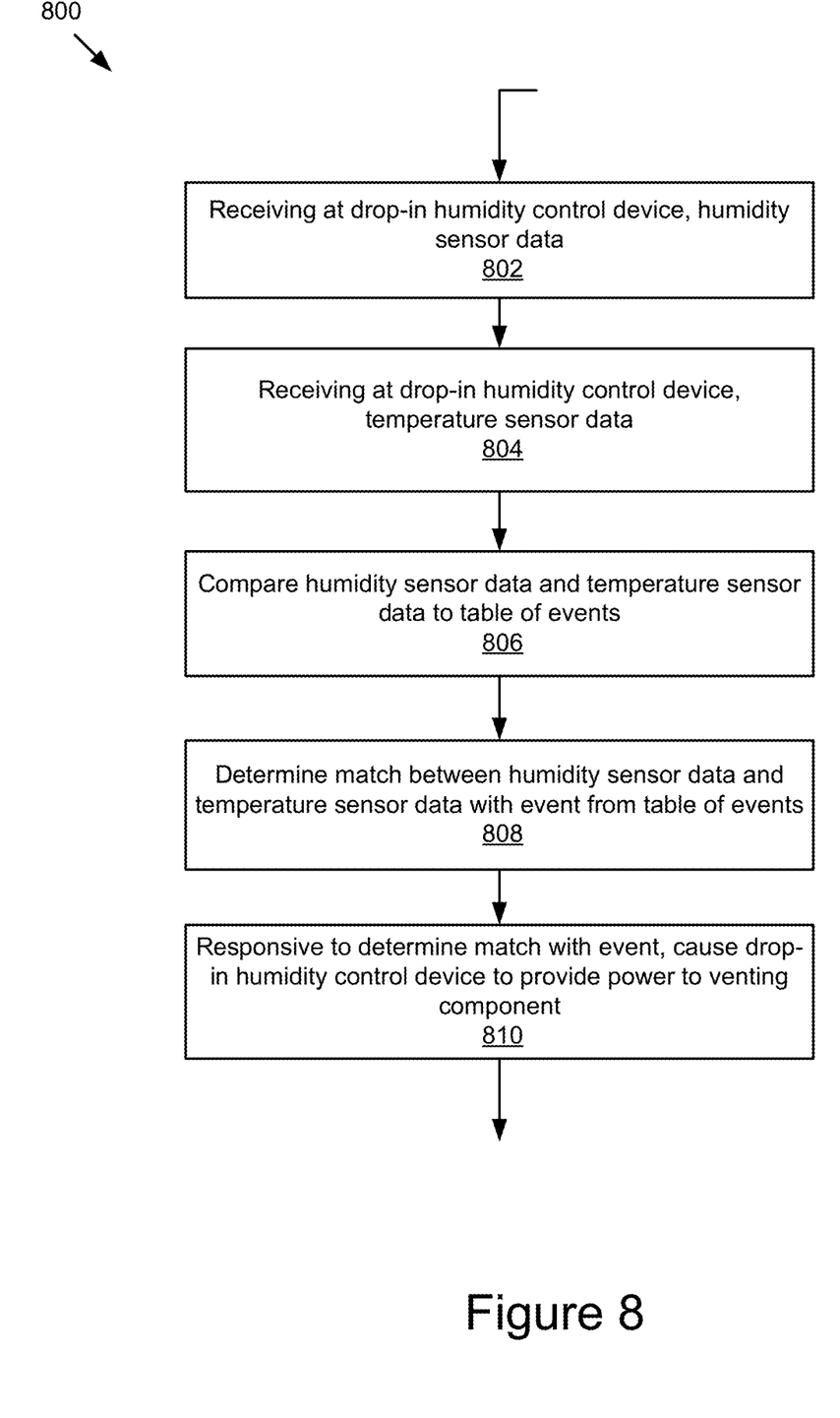
FIG. 8 is a flowchart for operating a venting component.

FIG. 8 is a flowchart 800 of an example method for providing power to a venting component. At 802, the humidity application 214 receives humidity sensor data from a humidity sensor 210. In some implementations, the humidity sensor 210 is incorporated into an exterior surface of the cover 106, while in further implementations the humidity sensor 210 is remote from the device 100. The humidity sensor 210 captures humidity data to determine when there are increases in humidity, such as when a shower or bath is happening in a bathroom or when an air conditioning unit is operating. The humidity sensor 210 captures this humidity data over a period of time and can detect increased levels of humidity.

At 804, the humidity application 214 receives temperature sensor data from a temperature sensor 210. In some implementations, the temperature sensor 210 can be internal to the device 100 or external, such as remote or mounted on an exterior surface of a cover 106. In some implementations, multiple temperature sensors 210 may be used at various locations, and the humidity application 214 may ignore values from certain locations depending in the data needed or average the values of various temperature sensors 210. In temperature sensor 210 captures temperature data to determine an increase/decrease in temperature or heat, such as when a shower or bath is happening or when an air conditioning unit is operating.

At 806, the humidity application 214 compares the humidity sensor data and the temperature sensor data to a table of events. The table of events includes various events that correspond to different sensor readings. For example, a shower/bath event more correlate to an increase in both temperature and humidity over a short period of time. In another example, an air conditioning event may correlate to an increase in humidity and corresponding decrease in temperature. In another example, a humidifier event may correlate to an increase in humidity but not the fast increase in temperature that a shower event includes, thus the increase in humidity with a slower increase or minimal increase in temperature may be characterized as a humidifier event when a person is using an in-room humidifier. Over time, the humidity application 214 can characterize various events at various levels of sensor detail. For example, over time the humidity application 214 can begin to model when a person is in a room based on a small increase in temperature from body heat or what the data for events looks like at different times of day and during different seasons. The model of events can be improved over time as data is sampled and various machine learning algorithms could be used to further interpret events. In some implementations, user input via a computing device 216 can also be used to categorize different events. In some implementations, push notifications can be sent to a computing device to answer questions about what is occurring in order to further characterize data in substantially real-time.

At 808, the humidity application 214 can determine a match between humidity sensor data and temperature sensor data with an event from the table of events. The humidity application 214 can match the provided data to characterized events as described above and additionally identify new or outlier events that don't match any event models. Once an event is matched, the humidity application 214 can determine an appropriate action for the event. In some implementations, the appropriate action is to cause the venting component 102 to turn on a fan for a period of time, such as when a shower or occurring. In further implementations, the appropriate action is to not turn on the venting component 102, such as when an air conditioner is running, causing an increase in humidity. In further implementations, additional sensor data, such as from light sensors, motion sensors, water sensors, can also be used to characterize various events and/or routines the device 100 can cause to be executed and turn on/off various peripheral components 212

At 810, the humidity application 214 causes the drop-in humidity control device to provide power to the venting component 102 responsive to determining that turning on the power is an appropriate response to the event. In some implementations, this causes power to be provided to the venting component 102 and allows the fan to turn on and vent out the humidity for a period of time. By being able to automatically turn on the fan in substantially real-time as humidity levels are detected, the humidity can be removed without causing long-term damage to the room. Additionally, by being able to determine which events are appropriate to turn on the fan, the device 100 will also not turn on the fan to vent when not required, such as when air conditioning is cooling a room.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A drop-in humidity controlling device comprising:
one or more sensors configured to collect humidity data and temperature data; and
a drop-in housing configured to be positioned inside of a preexisting exhaust fan, the drop-in housing intersecting between a power supply and a venting component of the preexisting exhaust fan by connecting a plug of the drop-in housing to the power supply inside of the preexisting exhaust fan and connecting a plug of the venting component to an outlet of the drop-in housing, the drop-in housing including a command application configured to receive the humidity data and temperature data and cause the venting component to receive power from the power supply responsive to the humidity data and the temperature data.

2. The drop-in humidity controller device of claim 1, wherein the command application is further configured to cause the venting component to receive power from the power supply responsive to the humidity data exceeding a threshold value.

3. The drop-in humidity controller device of claim 1, wherein command application is further configured to cause the venting component to receive power from the power supply responsive to the humidity data increasing beyond a threshold value over a short period of time.

4. The drop-in humidity controlling device of claim 1, wherein the command application is further configured to analyze the humidity data and the temperature data sampled over a period of time, compare the analyzed humidity data and temperature data to a table of events to identify a matching event, and cause the venting component to receive power from the power supply responsive to the matching event being a shower event.

5. The drop-in humidity controlling device of claim 4, wherein the shower event corresponds to data showing an increase in temperature and an increase in humidity over a short period of time.

6. The drop-in humidity controlling device of claim 1, wherein the command application is further configured to analyze the humidity data and the temperature data sampled over a period of time, compare the analyzed humidity data and temperature data to a table of events to identify a matching event, and cause the venting component to stop receiving power from the power supply responsive to the matching event being an air conditioning event.

7. The drop-in humidity controlling device of claim 6, wherein the air conditioning event corresponds to data showing a decrease in temperature and an increase in humidity over a short period of time.

8. The drop-in humidity controlling device of claim 1, further comprising:
a cover that is configured to attach to the venting component, the cover including one or more peripheral components connectable to the command application and incorporated into an exterior surface of the cover.

9. The drop-in humidity controlling device of claim 8, wherein the peripheral components includes one or more of a music playback system, a speaker, a microphone, and a light.

10. The drop-in humidity controlling device of claim 8, wherein the cover further comprises one or more sensors connectable to the command application and incorporated into an exterior surface of the cover.

11. A drop-in power controller comprising:
a power command application that receives a command to control a power supply to an exhaust fan; and
a power controller device configured to be positioned inside of a preexisting ventilation housing and the power controller device intersecting between the power supply and the exhaust fan by connecting a plug of the power controller device to the power supply inside of the preexisting ventilation housing and connecting a plug of the exhaust fan to an outlet of a drop-in housing of the drop-in power controller, the power controller device causing the power supply to be connected to the exhaust fan in response to the power command application receiving the command to turn on the exhaust fan in response to a criteria being satisfied.

12. The drop-in power controller of claim 11, wherein the power controller device controls a powered connection when the power controller device is connected between the power supply and the exhaust fan.

13. The drop-in power controller of claim 12, wherein the power controller device is connected to additional peripheral hardware.

14. The drop-in power controller of claim 13, wherein the additional peripheral hardware includes one or more of a music playback system, a speaker, a microphone, and a light.

15. The drop-in power controller of claim 12, wherein the power controller device is connected to one or more sensors.

16. The drop-in power controller of claim 15, wherein the one or more sensors include one or more of a humidity sensor, a temperature sensor, a water sensor, a heat sensor, an ambient light sensor, a motion sensor, and a noise sensor.

17. The drop-in power controller of claim 15, wherein the criteria being satisfied includes the power controller device receives sensor data from the one or more sensors and determines the criteria is satisfied if the sensor data exceeds a threshold value.

18. The drop-in power controller of claim 17, wherein the sensor data exceeds a threshold value includes humidity data exceeding a humidity value and wherein the drop-in power controller causes the power supply to be connected to the exhaust fan for a period of time.

19. A method comprising:
receiving at a drop-in humidity control device installed in a preexisting ventilation housing between a power supply and a venting component by connecting a plug of a drop-in housing of the drop-in humidity control device to the power supply inside of the preexisting ventilation housing and connecting a plug of the venting component to an outlet of the drop-in housing of the drop-in humidity control device, humidity sensor data from a humidity sensor;

receiving at the drop-in humidity control device, temperature sensor data from a temperature sensor;

comparing, using a processor the drop-in humidity control device, the humidity sensor data and the temperature sensor data to a table of events;

determining, using a processor the drop-in humidity control device, a match between the humidity sensor data and the temperature sensor data with an event from the table of events; and responsive to determining the match with the event, causing the drop-in humidity control device to provide power from the power supply to the venting component that the drop-in humidity control device is connected to.

20. The method of claim 19, wherein the event is a shower event, and the shower event matches with the temperature sensor data increasing and the humidity sensor data increasing.

\* \* \* \* \*